(12) United States Patent
Zhang et al.

(10) Patent No.: US 11,353,758 B2
(45) Date of Patent: Jun. 7, 2022

(54) ARRAY SUBSTRATE, DISPLAY PANEL, DISPLAY DEVICE AND DRIVING METHOD

(71) Applicants: BEIJING BOE DISPLAY TECHNOLOGY CO., LTD., Beijing (CN); BOE TECHNOLOGY GROUP CO., LTD., Beijing (CN)

(72) Inventors: Yinghao Zhang, Beijing (CN); Qian Wang, Beijing (CN); Duo Zhang, Beijing (CN); Yongquan Lu, Beijing (CN); Dongxue Sun, Beijing (CN); Feng Jiang, Beijing (CN); Xuru Zhang, Beijing (CN); Weimeng Zhang, Beijing (CN); Yanjie Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/078,179

(22) Filed: Oct. 23, 2020

(65) Prior Publication Data

US 2021/0124205 A1     Apr. 29, 2021

(30) Foreign Application Priority Data

Oct. 25, 2019   (CN) .......................... 201911026097.2

(51) Int. Cl.
*G09G 3/36*  (2006.01)
*G02F 1/1362*  (2006.01)
*G02F 1/1368*  (2006.01)

(52) U.S. Cl.
CPC ........ *G02F 1/13624* (2013.01); *G02F 1/1368* (2013.01); *G02F 1/136286* (2013.01);
(Continued)

(58) Field of Classification Search
CPC ..... G09G 3/2074; G09G 3/0983–0986; G09G 3/3233–3258; G09G 3/3607–3659;
(Continued)

(56) References Cited

U.S. PATENT DOCUMENTS

| 6,011,530 A * | 1/2000 | Kawahata ............ G09G 3/3659 345/212 |
| 2007/0103615 A1 | 5/2007 | Cheng et al. |

(Continued)

FOREIGN PATENT DOCUMENTS

| CN | 101354514 A | 1/2009 |
| CN | 104464644 A | 3/2015 |
| CN | 108962120 A | 12/2018 |

OTHER PUBLICATIONS

First office action of Chinese application No. 201911026097.2 dated Oct. 9, 2021.

*Primary Examiner* — Sanghyuk Park
(74) *Attorney, Agent, or Firm* — Fay Sharpe LLP

(57) ABSTRACT

Disclosed are an array substrate, a display panel, a display device, and a driving method. The array substrate includes a plurality of data lines, and a plurality of columns of pixel structures which are respectively connected to the plurality of data lines in one-to-one correspondence. Each of the plurality of columns of the pixel structures includes a plurality of pixel structures. Each of the plurality of pixel structures includes two adjacent sub-pixel units and a first transistor. The sub-pixel unit includes a second transistor. The first transistor is connected to the second transistors of the two adjacent sub-pixel units and the data line respectively.

13 Claims, 5 Drawing Sheets

(52) U.S. Cl.
CPC ......... *G09G 3/3677* (2013.01); *G09G 3/3688* (2013.01); *G09G 2300/0819* (2013.01)

(58) Field of Classification Search
CPC .......................... G09G 2300/04–0895; G09G 2310/0251–0275; G09G 2320/029–0295; G09G 2330/10; G09G 2340/0457; G09G 2340/10–16; G09G 2360/142–148
See application file for complete search history.

(56) References Cited

U.S. PATENT DOCUMENTS

| | | | |
|---|---|---|---|
| 2009/0026452 A1 | 1/2009 | Miyaguchi et al. | |
| 2014/0146027 A1* | 5/2014 | Tsuge .................. | G09G 3/3233 345/208 |
| 2016/0307510 A1 | 10/2016 | Duan et al. | |
| 2019/0228727 A1* | 7/2019 | Wu ...................... | G09G 3/3659 |
| 2020/0043394 A1 | 2/2020 | Bai et al. | |

* cited by examiner

ARRAY SUBSTRATE, DISPLAY PANEL, DISPLAY DEVICE AND DRIVING METHOD

TECHNICAL FIELD

The present disclosure relates to the field of displays, and more particularly, an array substrate, a display panel, and a driving method thereof.

BACKGROUND

Thin film transistors (TFTs) are widely used in liquid crystal displays (LCDs), which are referred to as TFT-LCDs.

In the TFT-LCD, pixel units are arranged in an array, and each pixel unit has a capacitor. During a liquid crystal holding phase, the power in the capacitor may leak through the TFT. In order to reduce a leakage current generated by the TFT, a method of increasing the number of TFTs in the pixel units is adopted in the related art, such that the impedance of a TFT circuit becomes larger, thereby reducing the leakage current and prolonging the discharge time of liquid crystals.

SUMMARY

Embodiments of the present disclosure provide an array substrate, a display panel, a display device, and a driving method.

In one aspect, embodiments of the present disclosure provide an array substrate. The array substrate includes:

a plurality of data lines; and a plurality of columns of pixel structures which are respectively connected to the plurality of data lines in one-to-one correspondence; wherein each of the plurality of columns of the pixel structures includes a plurality of pixel structures, each of the plurality of pixel structures including two adjacent sub-pixel units and a first transistor, the sub-pixel unit including a second transistor, and the first transistor being connected to the second transistors of the two adjacent sub-pixel units and the data line respectively.

In some embodiments, the number of second transistors in the sub-pixel unit is either 1 or 2.

In some embodiments, the number of first transistors in the pixel structure is either 1 or 2.

In some embodiments, the sub-pixel unit includes one second transistor, and the pixel structure includes one first transistor, wherein and the first transistor is between two second transistors in the pixel structure to which the first transistor belongs.

In some embodiments, the sub-pixel units in the plurality of columns of pixel structures are divided into a plurality of lines of sub-pixel units; the second transistors in a row of the sub-pixel units are connected to the same first gate line; and the first transistors connected a row of the sub-pixel units are connected to the same second gate line.

In some embodiments, one second gate line connected to the same pixel structure is located between two first gate lines connected to the same pixel structure.

In another aspect, embodiments of the present disclosure provide a display panel. The display panel includes any of the array substrates described above.

In some embodiments, the display panel further includes a driving module, configured to:

control, when a first sub-pixel unit in each of the plurality of pixel structures operates, the second transistor of the first sub-pixel unit and the first transistor to be turned on; and control, when a second sub-pixel unit in each of the plurality of pixel structures operates, the second transistor of the second sub-pixel unit and the first transistor to be turned on, wherein the first sub-pixel unit and the second sub-pixel unit are two sub-pixel units sequentially arranged in any one of the pixel structures in a scanning direction of the display panel.

In some embodiments, the driving module is further configured to provide a gate-on level to a first gate line connected to the second transistor of the first sub-pixel unit and a second gate line connected to the first transistor when the first sub-pixel unit operates; and provide a gate-on level to a first gate line connected to the second transistor of the second sub-pixel unit and a second gate line connected to the first transistor when the second sub-pixel unit operates.

In yet another aspect, embodiments of the present disclosure provide a driving method for driving any of the display panels described above. The driving method includes:

controlling, when the first sub-pixel unit in each pixel structure operates, the second transistor of the first sub-pixel unit and the first transistor to be turned on; and controlling, when the second sub-pixel unit in each pixel structure operates, the second transistor of the second sub-pixel unit and a first transistor to be turned on, wherein the first sub-pixel unit and the second sub-pixel unit are two sub-pixel units sequentially arranged in any one of the pixel structures in a scanning direction of the display panel.

In some embodiments, controlling the second transistor of the second sub-pixel unit and the first transistor to be turned on includes: providing a second gate-on level to a first gate line connected to the second transistor of the first sub-pixel unit and a gate line connected to the first transistor; and controlling the second transistor of the second sub-pixel unit and the first transistor to be turned on includes: providing a second gate-on level to a first gate line connected to the second transistor of the second sub-pixel unit and a gate line connected to the first transistor.

DETAILED DESCRIPTION

For clearer descriptions of the objects, technical solutions and advantages of the present disclosure, embodiments of the present disclosure are described in detail below in combination with the accompanying drawings.

Figure 1:
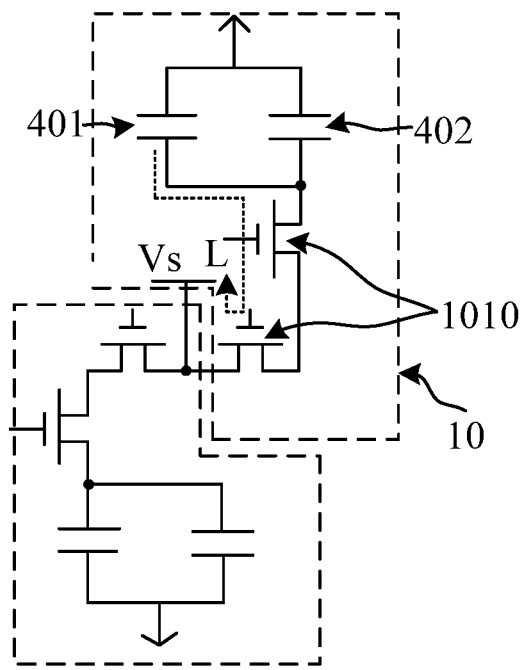
FIG. 1 illustrates a schematic structural diagram of two sub-pixel units in a column of sub-pixel units of a TFT-LCD in the related art.

In a display panel, each column of the sub-pixel units includes a plurality of sub-pixel units. FIG. 1 illustrates a schematic structural diagram of two sub-pixel units in a column of sub-pixel units of a TFT-LCD in the related art. Referring to FIG. 1, each sub-pixel unit 10 includes two TFTs 1010 connected in series, wherein the two TFTs connected in series are connected in series between a capacitor (including a storage capacitor 401 and a liquid crystal capacitor 402) and a data line. A leakage current is reduced by connecting the TFTs in series. The leakage current flows from the capacitor to the data line through the two TFTs in sequence. The flow direction is shown by an arrow L in FIG. 1. In FIG. 1, Vs represents a voltage provided by the data line. FIG. 1 is merely an example. If the leakage current is to be further reduced, more TFTs may be provided in each sub-pixel unit 10, that is, the number of the TFTs is greater than 2.

In the related art, the area occupied by each sub-pixel unit 10 increases owing to a relatively large number of TFTs in a single sub-pixel unit 10, which reduces the resolution of a liquid crystal display and is not conducive to the design and manufacture of high-resolution display panels.

Figure 2:
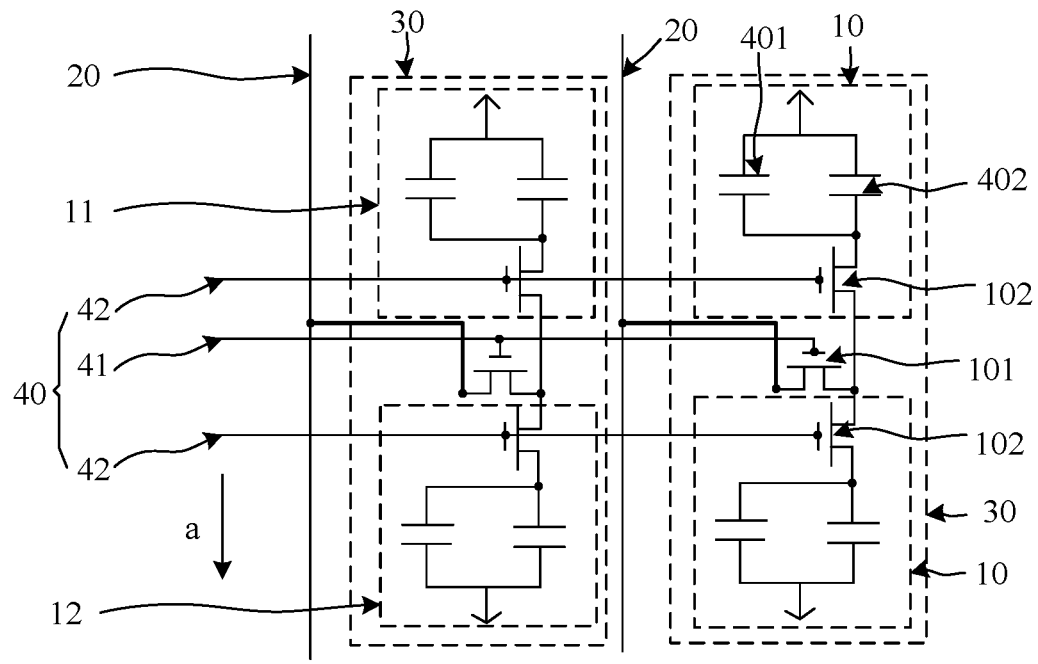
FIG. 2 is a schematic diagram of a pixel structure of the TFT-LCD according to an embodiment of the present disclosure.

FIG. 2 is a schematic diagram of a pixel structure of a TFT-LCD according to an embodiment of the present disclosure. Referring to FIG. 2, the array substrate includes a plurality of data lines 20 and a plurality of columns of pixel structures 30.

The plurality of columns of pixel structures 30 are respectively connected to the plurality of data lines 20 in one-to-one correspondence. Each column of the pixel structures 30 includes a plurality of pixel structures 30. Each pixel structure 30 includes two adjacent sub-pixel units 10 and a first transistor 101. Each sub-pixel unit 10 includes a second transistor 102. The first transistor 101 is connected to the second transistor 102 of the two adjacent sub-pixel units 10, and the data line 20 respectively.

The second transistor 102 is a transistor individually controlled by the sub-pixel unit 10 where the second transistor is located, and the first transistor 101 is a transistor shared by two sub-pixel units 10 in each pixel structure 30.

Each sub-pixel unit 10 includes N individually controlled transistors. Each pixel structure 30 includes M shared transistors. The N individually controlled transistors in each sub-pixel unit 10 are connected in series to the M shared transistors in the pixel structure 30, N and M being both positive integers.

Exemplarily, the first transistor 101 and the second transistor 102 are both TFTs.

The series connection of the transistors means that at least two transistors are connected in sequence, and every two adjacent transistors are connected by a source and a drain, respectively.

Referring to FIG. 2, the two sub-pixel units 10 in each pixel structure 30 may be a first sub-pixel unit 11 and a second sub-pixel unit 12 respectively.

In the related art, if each sub-pixel unit 10 includes M+N transistors, two sub-pixel units 10 include 2M+2N transistors. In the present disclosure, each sub-pixel unit includes M+N transistors, where M transistors are shared, such that the two sub-pixel units 10 include 2N+M transistors in total. Therefore, the present disclosure reduces the number of transistors on the premise of ensuring a suppression effect on the leakage current.

In contrast, the average number of transistors in each sub-pixel unit 10 in the present disclosure is reduced. That is, the number of transistors in the array substrate is reduced, the area occupied by each sub-pixel unit 10 is also reduced, and the resolution of the liquid crystal display is improved. Since the area occupied by each sub-pixel unit 10 is reduced, and the proportion of light passing through the liquid crystal display is increased, an aperture ratio and a light transmittance of the liquid crystal display can be improved.

The N individually controlled second transistors 102 in each sub-pixel unit 10 are connected in series to the M shared first transistors 101. Therefore, when the first sub-pixel unit 11 operates, the N individually controlled second transistors 102 in the first sub-pixel unit 11 and the M shared first transistors 101 are controlled to be turned on. Since the N first transistors 101 in the adjacent second sub-pixel units 12 are individually controlled, the N first transistors 101 in the second sub-pixel unit 12 are not turned on when the first sub-pixel unit 11 operates. Then, the second sub-pixel unit 12 will not work. That is, the first sub-pixel unit 11 and the second sub-pixel unit 12 can work independently.

In an exemplary embodiment, N=1 or N=2. That is, each sub-pixel unit 10 individually controls one first transistor 101 or two first transistors 101, so as to reduce the number of the transistors in the array substrate as much as possible, reduce the area occupied by each sub-pixel unit 10, and improve the resolution of the liquid crystal display.

In an exemplary embodiment, each sub-pixel unit 10 may include two transistors, wherein each sub-pixel unit 10 includes one individually controlled second transistor 102 and one shared first transistor 101. Alternatively, each sub-pixel unit 10 may include three transistors, wherein each sub-pixel unit 10 includes two individually controlled second transistors 102 and one shared first transistor 101.

In an exemplary embodiment, each sub-pixel unit 10 may include more than two individually controlled second transistors 102. Each sub-pixel unit 10 may also include two or more shared first transistors 101.

In an exemplary embodiment, M=1 or M=2. That is, two adjacent sub-pixel units 10 in each pixel structure 30 share one first transistor 101 or share two first transistors 101, so as to reduce the number of the transistors in the array substrate as much as possible, reduce the area occupied by each sub-pixel unit 101, and improve the resolution of the liquid crystal display.

In an exemplary embodiment, each sub-pixel unit 10 includes one individually controlled second transistor 102, and each pixel structure 30 includes one shared first transistor 101. The first transistor 101 is located between two second transistors 102 in the pixel structure 30 to which it belongs. This layout can facilitate the connection between the first transistor 101 and the second transistor 102, and facilitate the design and manufacture.

In an exemplary embodiment, each sub-pixel unit 10 includes one individually controlled second transistor 102, and each pixel structure 30 includes two shared first transistors 101. The two first transistors 101 are located between the two second transistors 102 in the pixel structure 30 to which the two first transistors 101 belong.

In an exemplary embodiment, each pixel structure 30 may include more than two shared first transistors 101. Each sub-pixel unit 10 may also include two or more individually controlled second transistors 102.

In an exemplary embodiment, N=1 or M=1. As shown in FIG. 2, when N and M are both 1, each sub-pixel unit 10 includes one individually controlled second transistor 102, and every two adjacent sub-pixel units 10 in each group share one first transistor 101. Therefore, the number of the transistors is reduced by ¼ on the basis of the related art, the area occupied by each sub-pixel unit 10 is reduced, and the resolution of the liquid crystal display is improved.

In the embodiment of the present disclosure, a value of an equivalent resistance of the transistor in each sub-pixel unit 10 is greater than that of the equivalent resistance of the transistor in the related art, such that the leakage current may be reduced and the discharge time of liquid crystals may be prolonged. The following analysis shows that the value of the equivalent resistance of the transistor in each sub-pixel unit 10 of the present disclosure is greater than that of the equivalent resistance in the related art.

As shown in FIG. 2, each sub-pixel unit 10 includes a storage capacitor 401 and a liquid crystal capacitor 402. The liquid crystal capacitor 402 refers to a capacitor formed between a pixel electrode on the array substrate and a common electrode on a color filter substrate, and the storage capacitor 401 may refer to a capacitor formed between the pixel electrode on the array substrate and a gate line. In a scanning phase, a data line 20 writes a data signal to the pixel electrode, thereby charging the liquid crystal capacitor 402. The liquid crystal capacitor 402 maintains the deflection of liquid crystals during a holding phase. The storage capacitor 401 may also be charged during the scanning phase. The storage capacitor 401 may supplement the liquid crystal capacitor 402 with electrical energy during the holding phase. The storage capacitor 401 and the liquid crystal capacitor 402 may have the aforementioned leakage current during the holding phase.

Figure 3:
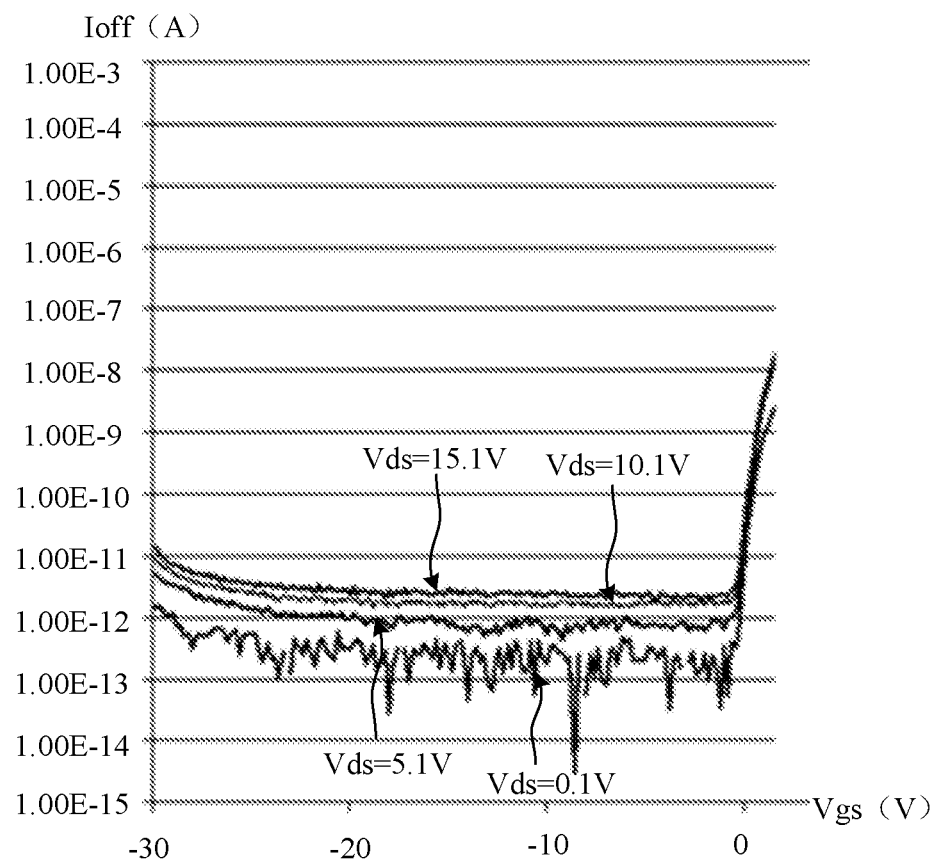
FIG. 3 is a graph of the relationship between a leakage current and a gate-to-source voltage according to an embodiment of the present disclosure.

FIG. 3 is a graph of the relationship between a leakage current and a gate-to-source voltage according to an embodiment of the present disclosure. Referring to FIG. 3, in the four cases of source-to-drain voltages $V_{ds}=0.1$ V, $V_{ds}=5.1$ V, $V_{ds}=10.1$ V, and $V_{ds}=15.1$ V, a relational graph of a leakage current $I_{off}$ and a gate-to-source voltage $V_{gs}$ is illustrated.

In FIG. 3, the abscissa represents a gate-to-source voltage ($V_{gs}$) of the transistor, V; and the ordinate represents a leakage current ($I_{off}$), A. As seen from FIG. 3, when the gate-to-source voltage of the transistor is constant (that is, when the resistance of the transistor is constant), the greater the source-drain voltage of the transistor is, and the greater the leakage current is, which conforms to the Ohm's law. For example, as shown in FIG. 3, When the gate-to-source voltage is −10V, the corresponding leakage current in the case of $V_{ds}=15.1$ V is significantly greater than the corresponding leakage current in the case of $V_{ds}=5.1$ V. Then, when a source-to-drain voltage of the transistor is constant, the leakage current may be reduced by increasing a total resistance value of the transistors in the entire sub-pixel unit.

The gate-to-source voltage is generally −11 V to −8 V in the case that the gate-to-source voltage of the transistor has a negative value. The commonly used gate-to-source voltage ranges from −11 V to −8 V. In FIG. 3, an average value of points on respective lines corresponding to different gate-to-source voltages is used to obtain leakage currents under different source-to-drain voltages, a relational diagram between the leakage current and the source-to-drain voltage is obtained by fitting, and the results are shown in FIG. 4.

Figure 4:
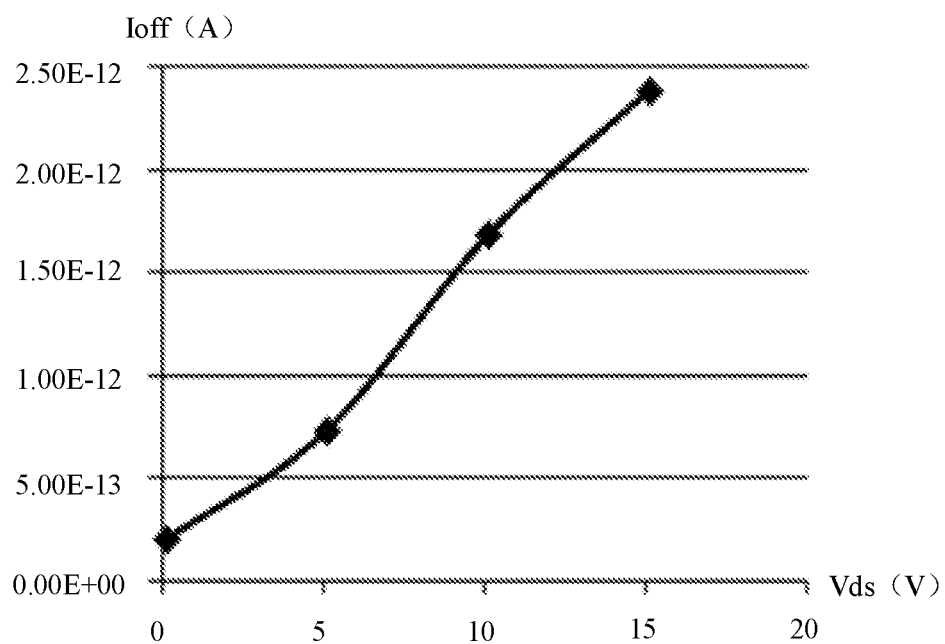
FIG. 4 is a graph of the relationship between a leakage current and a drain-to-source voltage according to an embodiment of the present disclosure.

FIG. 4 is a graph of the relationship between a leakage current and a source-to-drain voltage according to an embodiment of the present disclosure. Referring to FIG. 4, in the case that the gate-to-source voltage of the transistor is constant, $T_{off}$ is approximately proportional to $V_{ds}$, and a functional relationship between $T_{off}$ and $V_{ds}$ can be expressed as:

$$V_{ds}=K\times I_{off} \quad (1)$$

wherein K may be understood as a resistance value $R_{ds}$ of the transistor.

According to Formula (1), an equivalent circuit diagram of the leakage current ($I_{off}$) of the transistor and the gate-to-source voltage ($V_{gs}$) of the transistor in a liquid crystal holding state may be established.

Figure 5:
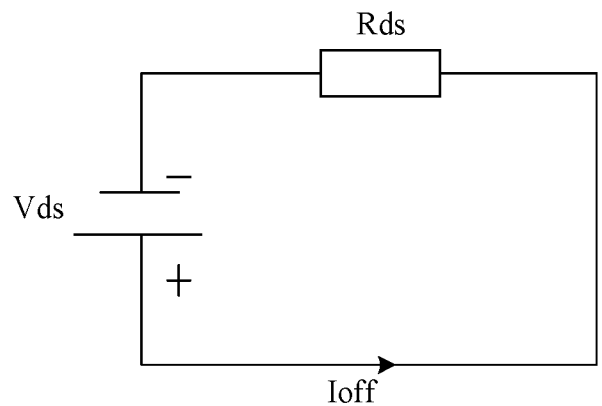
FIG. 5 is an equivalent circuit diagram of a part of pixel structures according to an embodiment of the present disclosure.

FIG. 5 is an equivalent circuit diagram of a part of pixel structures according to an embodiment of the present disclosure. Referring to FIG. 5, $R_{ds}$ represents a resistance value of the transistor. A circuit diagram shown in FIG. 5 accords with the Ohm's law.

$$V_{ds}=R_{ds}\times I_{off} \quad (2)$$

As can be seen from Formula (2): in the case that the source-to-drain voltages (Vds) of the transistors are the same, the larger the value of the resistance $R_{ds}$ is, the smaller the leakage current ($I_{off}$) is.

Figure 6:
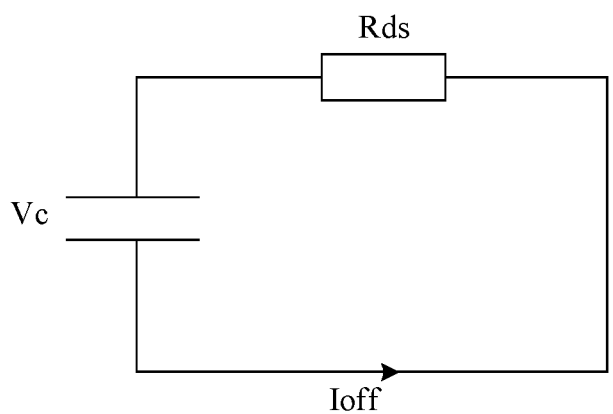
FIG. 6 is an equivalent circuit diagram of a part of pixel structures according to an embodiment of the present disclosure.

Further, as shown in FIG. 6, the equivalent circuit diagram in the liquid crystal holding state may be obtained from the equivalent circuit diagram shown in FIG. 5.

FIG. 6 is an equivalent circuit diagram of a part of pixel structures according to an embodiment of the present disclosure. Referring to FIG. 6, Vc represents a voltage at two ends of the liquid crystal capacitor. In the liquid crystal holding stage, one of a source and a drain of the transistor is connected to the liquid crystal capacitor, and the other of the source and the drain of the transistor is connected to a data line through another transistor. Alternatively, one of the source and the drain is connected to the liquid crystal capacitor through a transistor, and the other of the source and the drain of the transistor is connected to a data line. In this connection mode, when the voltage Vc of the liquid crystal capacitor decreases, the source-to-drain voltage Vas of the transistor also decreases accordingly. Therefore, the equivalent circuit of FIG. 6 can be obtained from the equivalent circuit of FIG. 5.

According to a discharge function of the capacitor, a function relationship of the voltage at two ends of the liquid crystal capacitor 402, which varies over time, is obtained.

$$Vt=Vc\times e^{(-t/(Rds\times C))} \quad (3)$$

Vt refers to a function of the voltage at two ends of the liquid crystal capacitor 402 and time, i.e., a function of the voltage at two ends of the liquid crystal capacitor, which varies over time in the liquid crystal holding state; t refers to time, second (s); C refers to a capacitance of the liquid crystal capacitor 402; and $R_{ds}$ refers to a resistance.

As can be seen from Formula (3), in an initial state, when the voltage Vc and the capacitance C of the liquid crystal capacitor 402 are constant, since e is a constant, the larger the resistance $R_{ds}$ is, the longer it takes when the voltage Vt at two ends of the liquid crystal capacitor 402 decreases to 0. That is, the leakage current may be reduced and the liquid crystal holding time may be prolonged by increasing the resistance.

Figure 7:
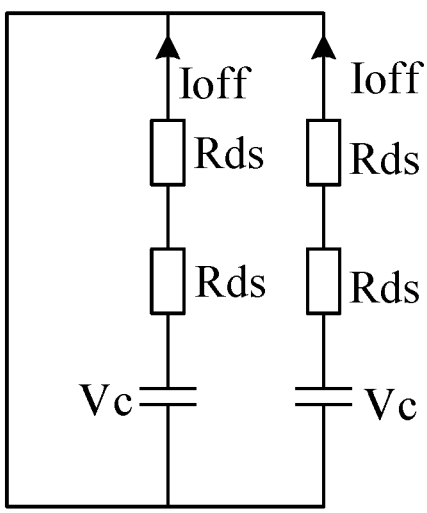
FIG. 7 is an equivalent circuit diagram of FIG. 1.

FIG. 7 is an equivalent circuit diagram of FIG. 1. That is, the equivalent circuit diagram shown in FIG. 7 is an equivalent circuit diagram of the schematic structural diagram of two sub-pixel units in a column of sub-pixel units in the TFT-LCD shown in FIG. 1.

Referring to FIG. 7, each sub-pixel unit is connected in series to two transistors, and every two adjacent sub-pixel units are connected in parallel with each other. $R^{ds}$ represents a resistance value of one transistor.

An equivalent resistance in a circuit in FIG. 7 is calculated according to the circuit diagram of FIG. 7. According to the Ohm's law:

$$Vc = 2 \times R_{ds} \times I_{off} \quad (4)$$

That is, the equivalent resistance of the equivalent circuit shown in FIG. 7 is $2R_{ds}$, and the leakage current is obtained:

$$I_{off} = Vc/(2 \times R_{ds}) \quad (5)$$

A function relationship of the voltage at two ends of the liquid crystal capacitor 402, which varies over time, as shown in FIG. 1 is obtained according to the capacitor discharge formula:

$$Vt = Vc \times e^{(-t/(2 \times Rds \times C))} \quad (6)$$

Figure 8:
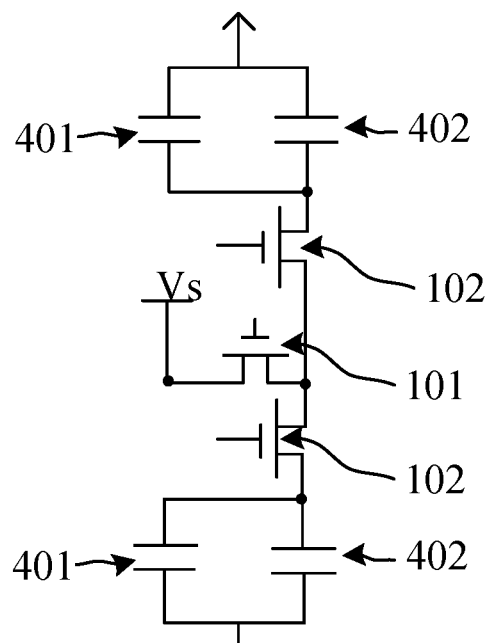
FIG. 8 is a schematic diagram showing the connection between a TFT and a capacitor according to an embodiment of the present disclosure.

FIG. 8 is a schematic diagram illustrating the connection between a TFT and a capacitor according to an embodiment of the present disclosure. M=N=1 is illustrated in a circuit diagram shown in FIG. 8.

Figure 9:
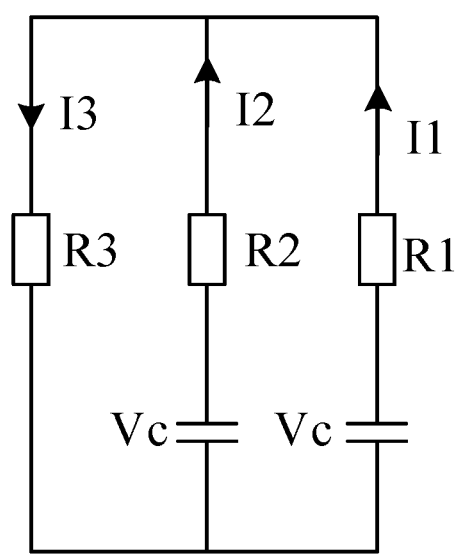
FIG. 9 is an equivalent circuit diagram of FIG. 8.

FIG. 9 is an equivalent circuit diagram of FIG. 8. Referring to FIG. 9, resistance values of individually controlled transistors in the two sub-pixel units are R1 and R2, respectively, and a resistance value of a transistor shared by the two sub-pixel units is R3. The resistance values of respective transistors in the array substrate are equal in an off state, that is, the resistance values of the three resistors are equal, $R1=R2=R3=R_{ds}$.

The currents of the two independently controlled transistors are equal, that is, I1=I2. Based on the current distribution law in a parallel circuit, the current of the shared transistor is I3=2×I1=2×I2. It may be obtained according to the Ohm's law:

$$R1 \times I1 + R3 \times I3 = Vc \quad (7)$$

R1=R2=R3, and I3=2×I1=2×I2 are substituted to obtain I1=Vc/(3R1).

$$I1 = I_{off} = Vc/(3R_{ds}) \quad (8)$$

That is, the equivalent resistance in the equivalent circuit diagram shown in FIG. 9 is $3 R_{ds}$, and the leakage current $I_{off}=Vc/(3R_{ds})$. According to the capacitor discharge formula, a function relationship of the voltage at two ends of the liquid crystal capacitor, which varies over time, as shown in FIG. 8 is obtained:

$$Vt = Vc \times e^{(-t/(3 \times Rds \times C))} \quad (9)$$

As can be seen from Formula (5) and Formula (8), in the case that parameters of the liquid crystal capacitor 402 are the same as those of the transistor, the leakage current ($I_{off}$) in the embodiment of the present disclosure is smaller in the liquid crystal holding state.

As can be seen from Formula (6) and Formula (9), in the case that the parameters of the liquid crystal capacitor 402 are the same as those of the transistor, the technical solution according to the embodiment of the present disclosure takes longer time (t) when the voltage (Vt) at two ends of the liquid crystal capacitor 402 decreases to 0 in the liquid crystal holding state, that is, the liquid crystal holding time is prolonged.

Figure 10:
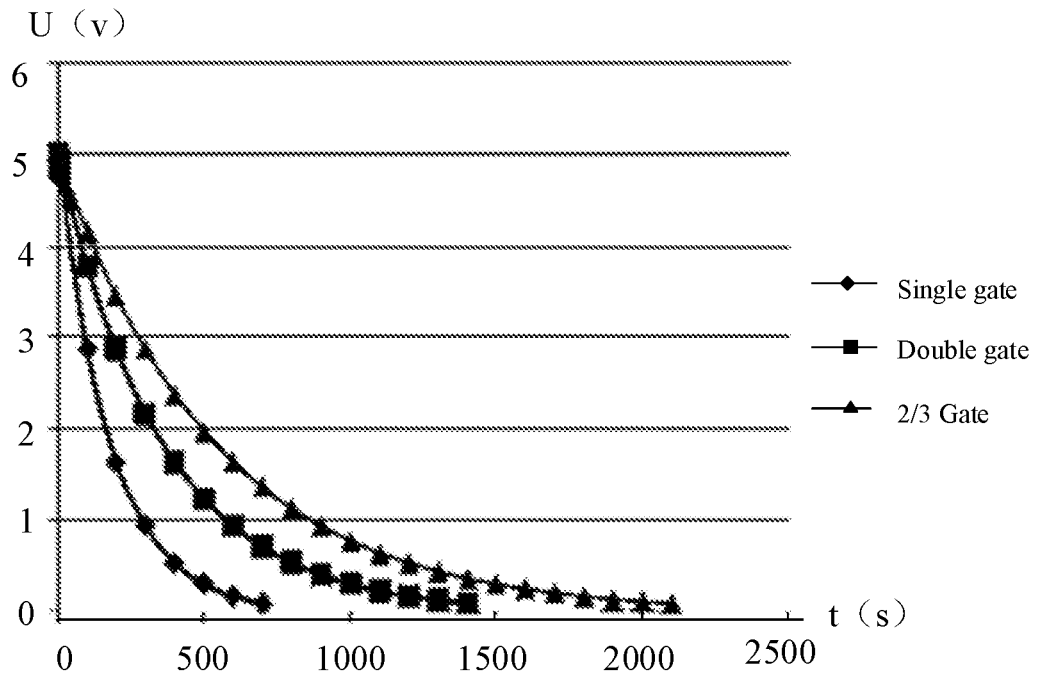
FIG. 10 illustrates a graph of the relationship between voltages at two ends of each of liquid crystal capacitors corresponding to various pixel structures and the time.

FIG. 10 shows a graph of the relationship between voltages at two ends of liquid crystal capacitors corresponding to respective pixel structures and the time. Referring to FIG. 10, the technical solution according to the present disclosure has the longest liquid crystal discharge time, the lowest initial discharge slope, and the longest liquid crystal holding time.

A single gate means that one sub-pixel unit 10 includes only one independently controlled second transistor 102, without a shared first transistor 101. A double gate means that a sub-pixel unit 10 only includes two independently controlled second transistors 102, without a shared first transistor 101, that is, a pixel structure connection mode of the TFT-LCD shown in FIG. 1. A 3/2 gate means that a sub-pixel unit 101 includes one individually controlled second transistor 102, two sub-pixel units 10 in one pixel structure 30 share one first transistor 101, and on average, each sub-pixel unit 10 includes 3/2 transistors. This solution according to the present disclosure has a smaller RCloading (load) than the related art. An input impedance is larger in the case of a smaller load, such that the current that can pass is relatively low. Therefore, the leakage current can be reduced. R represents a resistance and C represents a capacitance.

Referring to FIG. 2, the array substrate further includes a plurality of gate lines 40, the gate lines 40 including a first gate line 41 and a second gate line 42.

Further referring to FIG. 2, in the embodiment of the present disclosure, the sub-pixel units 10 in the plurality of columns of pixel structures 30 are divided into a plurality of lines of sub-pixel units 10. In a row of sub-pixel units 10, the individually controlled second transistors 102 in respective sub-pixel units 10 are connected to the same first gate line 41. The first transistors 101 connected to respective sub-pixel units 10 are connected to the same second gate line 42.

Exemplarily, one second gate line 42 connected to the same pixel structure 30 is located between two first gate lines 41 connected to the same pixel structure 30. Since the first transistor 101 is located between the two second transistors 102 in one pixel structure 30, the second gate line 42 is arranged between the two first gate lines 41 to facilitate wiring and routing.

In the case of a solution with a larger number of transistors, all the independently controlled second transistors 102 in a row of sub-pixel units 10 are connected to the same first gate line 41, and the first transistors 101 connected to respective sub-pixel units 10 are connected to the same second gate line 42.

The connection of the transistor to the gate line 40 means that a gate of the transistor is electrically connected to the gate line 40.

In an exemplary embodiment, the individually controlled second transistor 102 in each sub-pixel unit 10 and the shared first transistor 101 are connected to different gate lines 40 respectively. When one of the sub-pixel units 10 in a pixel structure 30 operates, another sub-pixel unit in the same group may be prevented from working by writing a gate-on level to the first gate line 41 connected to the N individually controlled second transistors 102 in the sub-pixel unit 10 and the M shared first transistors 101, and writing a gate-off level to the gate line 40 connected to the N individually controlled second transistors 102 in another sub-pixel unit 10, while this sub-pixel unit 10 is driven to work. In this way, the individually controlled second transistors 102 and the M shared first transistors 101 will not affect each other. At the same time, in this way, N or M transistors are respectively controlled by one gate line 40, which reduces the number of the gate lines 40 in the case of a larger number of transistors. Therefore, a wiring area on a backboard of the array substrate is reduced, and the resolution of the liquid crystal display can be improved.

In other exemplary embodiments, different second transistors 102 in the individually controlled second transistors 102 in each sub-pixel unit 10 are connected to different gate lines 40 respectively, or different first transistors 101 in the shared first transistor 101 in each sub-pixel unit 10 are connected to different gate lines 40 respectively.

In the embodiment of the present disclosure, the M shared first transistors 101 are connected between the data line 20 and the N individually controlled second transistors 102.

As mentioned above, in each sub-pixel unit 10, M shared first transistors 101 are connected in series to N individually controlled second transistors 102. Here, the shared first transistors 101 are arranged between the data line 20 and the individually controlled second transistors 102. For a pixel structure 30, the data line 20 only needs to be connected to the first transistor 101 in one place, thereby simplifying the circuit structure.

In an exemplary embodiment, as shown in FIG. 2, one common first transistor 101 is connected between one individually controlled second transistor 102 and the data line 20. A source of the shared first transistor 101 is connected to the data line 20. A drain of the shared first transistor 101 is simultaneously connected to a source of the individually controlled second transistor 102 of the two sub-pixel units 10 in one group. A drain of the individually controlled second transistor 102 is connected to a pixel electrode of the sub-pixel unit 10 where the individually controlled second transistor is located.

In an exemplary embodiment, the two sub-pixel units 10 in one pixel structure 30 are connected to the data line 20 through the shared first transistor 101. That is, one data line 20 may be simultaneously connected to two sub-pixel units 10 in one pixel structure 30 through the shared first transistor 101. That is, the connection between the data line 20 and the transistor of the sub-pixel unit 10 on the array substrate is simplified.

In other exemplary embodiments, it is also possible to connect N individually controlled second transistors 102 between the data line 20 and the M shared first transistors 101.

The present disclosure provides a display panel, which includes the array substrate. The number of the transistors on the array substrate of the display panel is reduced, and the area occupied by each sub-pixel unit 10 is reduced, which may improve the resolution of the liquid crystal display. Meanwhile, an equivalent resistance of the transistor of each sub-pixel unit 10 increases, such that the leakage current may be reduced, and the liquid crystal holding time is prolonged.

Figure 11:
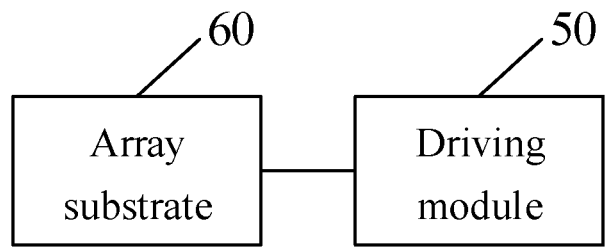
FIG. 11 is a block diagram of a display panel according to an embodiment of the present disclosure.

FIG. 11 is a block diagram of a display panel according to an embodiment of the present disclosure. Referring to FIG. 11, the display panel further includes a driving module 50. The driving module 50 is electrically connected to the array substrate 60.

The driving module 50 is configured to control N individually controlled second transistors 102 of a first sub-pixel unit 11 and M shared second transistors 101 to be turned on when the first sub-pixel unit 11 in each pixel structure 30 operates. The driving module 50 is configured to control N individually controlled second transistors 102 of a second sub-pixel unit 12 and M shared second transistors 101 to be turned on when the second sub-pixel unit 12 in each pixel structure 30 operates. The first sub-pixel unit 11 and the second sub-pixel unit 12 are two sub-pixel units 10 sequentially arranged in any one of the pixel structures 30 in a scanning direction a of the display panel.

In an exemplary embodiment, the driving module 50 provides a driving signal for the sub-pixel units 10. The driving module 50 charges gate lines 40 and data lines 20, and simultaneously charges a storage capacitor 401 and a liquid crystal capacitor 402.

The driving module 50 is configured to control the N individually controlled second transistors 102 of the first sub-pixel unit 11 and the M shared first transistors 102 to be turned on when the first sub-pixel unit 11 operates. In this case, the first sub-pixel unit 11 operates. At this time, the N independently controlled second transistors 102 in the second sub-pixel unit 12 are not turned on, so the second sub-pixel unit 12 will not be driven to work. That is, the working of the first sub-pixel unit 11 will not affect the working of the second sub-pixel unit 12. Similarly, the working of the second sub-pixel unit 12 will not affect the working of the first sub-pixel unit 11.

In an exemplary embodiment, the driving module 50 is configured to provide a grid-on level to a first gate line 41 connected to the N individually controlled second transistors 102 of the first sub-pixel unit 11 and a second gate line 42 connected to the M shared first transistors 101. In this case, a gate-off level is provided for the first gate line 41 connected to the N individually controlled second transistors 102 of the second sub-pixel unit 12.

A grid-on level is provided for the first gate line 41 connected to the N individually controlled second transistors 102 of the second sub-pixel unit 12 and a second gate line 42 connected to the M shared first transistors 101 when the second sub-pixel unit 12 operates. In this case, a gate-off level is provided for the first gate line 41 connected to the N individually controlled second transistors 102 of the first sub-pixel unit 11.

In an exemplary embodiment, a gate-on level is provided for the gate line 40 through the driving module 50.

Correspondingly, when the transistors in a line of sub-pixel units 10 are controlled to be turned on by two gate lines, the driving module 50 also writes corresponding data signals to respective sub-pixel units 10 in this line through the data line 20, thereby controlling each sub-pixel unit 10 to display a corresponding grayscale.

The present disclosure provides a display device, including the display panel. Similarly, the resolution of the display device can be improved, and meanwhile, the liquid crystal holding time of the display device can be prolonged.

Figure 12:
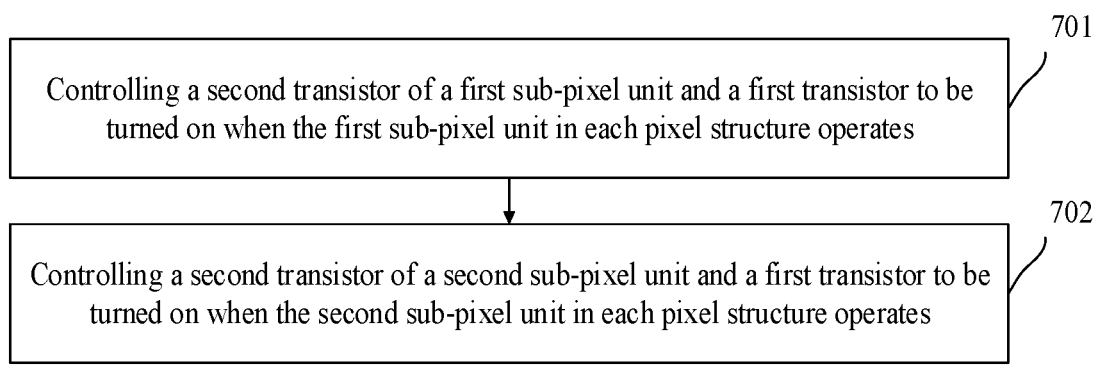
FIG. 12 is a flowchart of a driving method according to an embodiment of the present disclosure.

FIG. 12 is a flowchart of a driving method according to an embodiment of the present disclosure. Referring to FIG. 12, the driving method includes the following steps.

In step 701, a second transistor of a first sub-pixel unit and a first transistor are controlled to be turned on when the first sub-pixel unit in each pixel structure operates.

In an exemplary embodiment, controlling the second transistor of the first sub-pixel unit and the first transistor to be turned on includes:

providing a gate-on level to a first gate line connected to the second transistor of the second sub-pixel unit and a second gate line connected to the first transistor. In this case, a gate-off level is provided for the first gate line connected to the second transistor of the second sub-pixel unit.

In an exemplary embodiment, a gate-on level is provided for a first gate line connected to the second transistor of the first sub-pixel unit and a second gate line connected to the first transistor.

In step 702, a second transistor of a second sub-pixel unit and a first transistor are controlled to be turned on when the second sub-pixel unit in each pixel structure operates.

In an exemplary embodiment, controlling the second transistor of the second sub-pixel unit and the first transistor to be turned on includes:

providing a gate-on level to a first gate line connected to the second transistor of the second sub-pixel unit and a second gate line connected to the first transistor. In this case, a gate-off level is provided for the first gate line connected to the second transistors of the first sub-pixel unit.

In an exemplary embodiment, a gate-on level is provided for a first gate line connected to the second transistor of the second sub-pixel unit and a second gate line connected to the first transistor.

The first sub-pixel unit 11 and the second sub-pixel unit are two sub-pixel units 10 sequentially arranged in any one of the pixel structures in a scanning direction of the display panel. By means of this driving method, the first sub-pixel unit and the second sub-pixel unit are respectively controlled so that the two pixel units will not affect each other.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. An array substrate, comprising:
  a plurality of data lines; and
  a plurality of columns of pixel structures which are respectively connected to the plurality of data lines in one-to-one correspondence; wherein each of the plurality of columns of the pixel structures comprises a plurality of pixel structures, each of the plurality of pixel structures comprising two adjacent sub-pixel units and a first transistor, the sub-pixel unit comprising a second transistor, and the first transistor being connected to the second transistors of the two adjacent sub-pixel units and the data line respectively, wherein
  a number of first transistors in the pixel structure is two, the two first transistors are connected in series, and every two adjacent transistors, of the two first transistors and the second transistor, are connected by a source and a drain respectively; and
  the sub-pixel unit further comprises a liquid crystal capacitor and a storage capacitor, and the liquid crystal capacitor and the storage capacitor connected parallel are connected to a source or a drain of the second transistor, wherein the liquid crystal capacitor refers to a capacitor formed between a pixel electrode on the array substrate and a common electrode on a color filter substrate, and the storage capacitor refers to a capacitor formed between the pixel electrode on the array substrate and a gate line.

2. The array substrate according to claim 1, wherein a number of second transistors in the sub-pixel unit is either 1 or 2.

3. The array substrate according to claim 1, wherein the sub-pixel units in the plurality of columns of pixel structures are divided into a plurality of lines of sub-pixel units; the second transistors in a row of the sub-pixel units are connected to a same first gate line; and the first transistors connected to a row of the sub-pixel units are connected to a same second gate line.

4. The array substrate according to claim 3, wherein one second gate line connected to a same pixel structure is between two first gate lines connected to the same pixel structure.

5. A display panel, comprising an array substrate, wherein the array substrate comprises:
  a plurality of data lines; and
  a plurality of columns of pixel structures which are respectively connected to the plurality of data lines in one-to-one correspondence; wherein each of the plurality of columns of pixel structures comprises a plurality of pixel structures, each of the plurality of pixel structures comprising two adjacent sub-pixel units and a first transistor, the sub-pixel unit comprising a second transistor, and the first transistor being connected to the second transistors of the two adjacent sub-pixel units and the data line respectively, wherein
  a number of first transistors in the pixel structure is two, the two first transistors are connected in series, and every two adjacent transistors, of the two first transistors and the second transistor, are connected by a source and a drain respectively; and
  the sub-pixel unit further comprises a liquid crystal capacitor and a storage capacitor, and the liquid crystal capacitor and the storage capacitor connected parallel are connected to a source or a drain of the second transistor, wherein the liquid crystal capacitor refers to a capacitor formed between a pixel electrode on the array substrate and a common electrode on a color filter substrate, and the storage capacitor refers to a capacitor formed between the pixel electrode on the array substrate and a gate line.

6. The display panel according to claim 5, wherein a number of second transistors in the sub-pixel unit is either 1 or 2.

7. The display panel according to claim 5, wherein the sub-pixel units in the plurality of columns of pixel structures are divided into a plurality of lines of sub-pixel units; the second transistors in a row of the sub-pixel units are connected to a same first gate line; and the first transistors connected to a row of the sub-pixel units are connected to a same second gate line.

8. The display panel according to claim 7, wherein one second gate line connected to a same pixel structure is between two first gate lines connected to the same pixel structure.

9. The display panel according to claim 5, further comprising a driving module, configured to:
  control, when a first sub-pixel unit in each of the plurality of pixel structures operates, the second transistor of the first sub-pixel unit and the first transistor to be turned on; and
  control, when a second sub-pixel unit in each of the plurality of pixel structures operates, the second transistor of the second sub-pixel unit and the first transistor to be turned on, wherein the first sub-pixel unit and the second sub-pixel unit are two sub-pixel units sequentially arranged in any one of the pixel structures in a scanning direction of the display panel.

10. The display panel according to claim 9, wherein the driving module is further configured to:
  provide a gate-on level to a first gate line connected to the second transistor of the first sub-pixel unit and a second gate line connected to the first transistor when the first sub-pixel unit operates; and
  provide a gate-on level to a first gate line connected to the second transistor of the second sub-pixel unit and a second gate line connected to the first transistor when the second sub-pixel unit operates.

11. A display device, comprising the display panel as defined in claim 5.

12. A driving method for driving a display panel, wherein the display panel comprises an array substrate; the array substrate comprising a plurality of data lines, and a plurality of columns of pixel structures which are respectively connected to the plurality of data lines in one-to-one correspondence; wherein each of the plurality of columns of the pixel structures comprises a plurality of pixel structures, each of the plurality of pixel structures comprising two adjacent sub-pixel units and a first transistor, the sub-pixel unit comprising a second transistor, and the first transistor being connected to the second transistors of the two adjacent sub-pixel units and the data line respectively, wherein a number of first transistors in the pixel structure is two, the two first transistors are connected in series, and every two adjacent transistors, of the two first transistors and the second transistor, are connected by a source and a drain respectively; and the sub-pixel unit further comprises a liquid crystal capacitor and a storage capacitor, and the liquid crystal capacitor and the storage capacitor connected parallel are connected to a source or a drain of the second transistor, wherein the liquid crystal capacitor refers to a capacitor formed between a pixel electrode on the array substrate and a common electrode on a color filter substrate, and the storage capacitor refers to a capacitor formed between the pixel electrode on the array substrate and a gate line;

the driving method comprising:

controlling, when the first sub-pixel unit in each pixel structure operates, the second transistor of the first sub-pixel unit and the first transistor to be turned on; and controlling, when the second sub-pixel unit in each pixel structure operates, the second transistor of the second sub-pixel unit and a first transistor to be turned on, wherein the first sub-pixel unit and the second sub-pixel unit are two sub-pixel units sequentially arranged in any one of the pixel structures in a scanning direction of the display panel.

13. The driving method according to claim 12, wherein controlling the second transistor of the first sub-pixel unit and the first transistor to be turned on comprises:

providing a gate-on level to a first gate line connected to the second transistor of the first sub-pixel unit and a second gate line connected to the first transistor; and controlling the second transistor of the second sub-pixel unit and the first transistor to be turned on comprises:

providing a gate-on level to a first gate line connected to the second transistor of the second sub-pixel unit and a second gate line connected to the first transistor.

* * * * *